Nov. 22, 1932.  C. F. COOKSON  1,888,490
COOKER
Filed Aug. 30, 1930
Fig.1.
Fig.2.
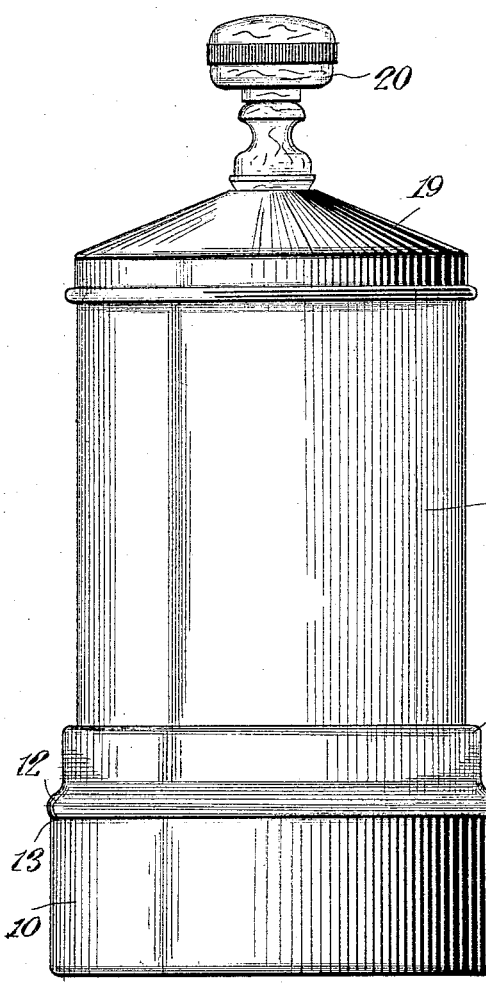
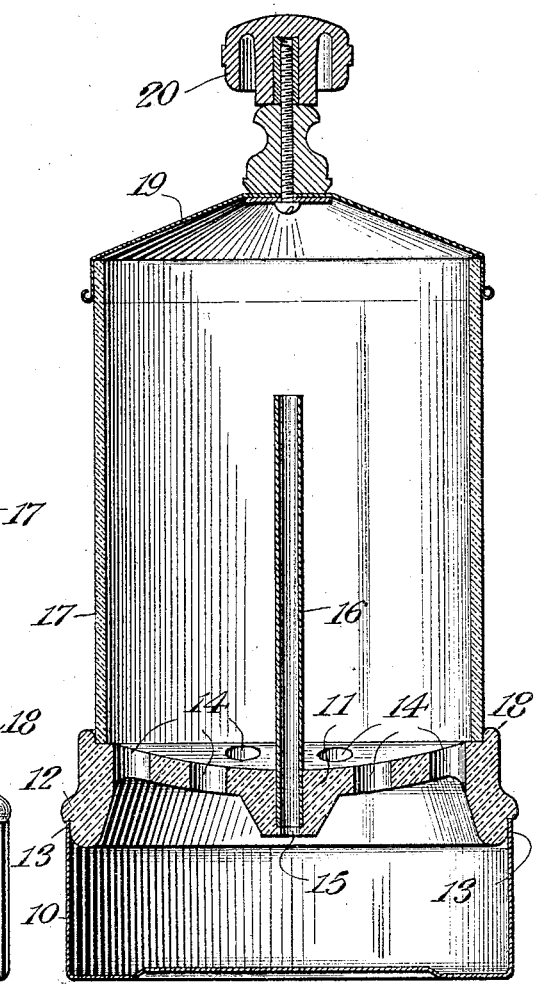
INVENTOR
Clarence F. Cookson
BY
Robert I. Hulsizer
ATTORNEY Patented Nov. 22, 1932

1,888,490

UNITED STATES PATENT OFFICE

CLARENCE F. COOKSON, OF LYNDHURST, NEW JERSEY, ASSIGNOR TO COUNTER COOKING MACHINE CORPORATION, OF NEW YORK, N. Y., A CORPORATION OF DELAWARE

COOKER

Application filed August 30, 1930. Serial No. 478,841.

This invention relates to cookers and has particular reference to a cooking machine or device for cooking such articles of food as Frankfurters and the like.

The main object of the invention is to provide a simple, compact, and durable device in which the articles to be cooked can be readily and easily placed and from which they can be easily and quickly removed when properly cooked.

A further object is to provide a simple and efficient cooking device whereby the articles are quickly and especially thoroughly cooked.

A still further object is to provide a simple and compact device whereby the articles, such as Frankfurters, may be quickly and thoroughly steamed, and in an efficient and uniform manner and in much less time than is usually the case.

Yet another object is to provide a cooker which is so constructed that the articles being treated are cooked in an entirely sanitary manner so that the articles do not come into contact with any surfaces during the cooking which would affect their proper condition as a pure well prepared food product.

Further and more specific objects, features, and advantages will more clearly appear from the detailed description given below when taken in connection with the accompanying drawing which forms part of the specification and which illustrates one present preferred form of the invention.

Briefly and in general terms the invention contemplates the cooking of articles of food such as Frankfurters altho it will be clear that other articles may be as well treated. The cooking device comprises a chamber in which the articles are readily placed. The walls of the chamber with which the articles come in contact are made of preferably non-metallic, non-reactive material such as glass and vitreous substances such as porcelain and enamel which will not chemically react with the food products to contaminate them either when cold or during the cooking process. Preferably the bottom wall of the chamber on which the articles rest is made of porcelain and is perforated to admit of the passage of the cooking medium such as vapor or steam from a liquid or steam chamber or vessel below the cooking chamber containing the articles. The steam vessel or chamber need not necessarily be of the same materials as the cooking chamber and is usually made of metal.

The bottom wall or support for the articles also is provided with an element such as a pipe which provides a passage leading from the steam or vapor chamber to a point well above the level of the top of the articles within the cooking chamber so that part of the vapor or steam is conducted to the top of the cooking chamber. The top wall or cover of the cooking chamber is preferably made of metal since it does not contact usually with the articles of food and is so constructed and arranged that when the steam or vapor from the pipe issues therefrom it will be deflected downwardly by the top or cover of the chamber and will then come into contact with the upper portions or surfaces of the articles of food so as to give to these portions or surfaces the same thorough and effective heat treatment to which the lower portions are subject by the vapor or steam flowing upwardly through the perforations in the bottom wall or support. It is thus found that the articles are thoroughly and uniformly treated and cooked in an unusually short time and are unusually well cooked and are not contaminated in any way so that they are in prime condition and pure for eating.

Preferably the steam or vapor vessel is so constructed that the support or bottom wall of the cooking chamber merely rests thereon. The side wall of the chamber also is so constructed as to rest on the bottom wall and the top wall or cover is so constructed as to merely rest on the enclosing side wall or member of the cooking chamber. Thus the parts are such as can be readily and quickly assembled and disassembled for removal of the articles and for their insertion as well as for the ready and easy cleaning of the parts of the device.

The drawing illustrates the present preferred form of the invention and in them, Fig. 1 is an elevation of the device; and, Fig. 2 is a vertical cross section through the device along a diameter thereof.

As shown in the drawing the device comprises a lower pan or vessel 10, which may contain water or other liquid to produce the proper cooking steam or vapor. On this pan there rests the bottom wall of the cooking chamber which is in the form of a plate of porcelain or similar material 11. This plate 11 is non-reactive to vapor or steam and will not affect the articles of food placed thereon. It is provided with a flange or bead 12 which rests on the top edge 13 of the steam vessel 10. The plate 11 is also provided with a series of holes or perforations such as 14 through which the vapor or steam from the pan or vessel 10 may pass into the chamber above and come into effective contact with the articles being cooked which may be Frankfurters.

The plate 11 is also provided with a passage 15 which forms a seat for an element or pipe 16 of vitreous enamel. This pipe forms a passage from the steam or vapor chamber in the pan 10 to a point well above and near the top of the cooking chamber. The side wall of the chamber for cooking is formed by an enclosing circular member preferably of glass 17 which rests on the top of the plate 11 and is held in position by a peripheral bead 18 along the outer edge of the plate 11.

The top wall of the cooking chamber is formed by the cover 19 preferably of metal altho it may be made of other material such as glass if desired. This cover is provided with a knob 20 whereby it can be manipulated easily. The inner surface of the cover 19 is preferably curved or shaped in such an angular fashion that as the steam or vapor from the pipe 16 issues therefrom it will be deflected by the inner surface of the cover 19 and directed downwardly on to the top of the articles being cooked. Thus the top of the articles will and are subject to a thorough and effective influence of the vapor or steam as well as the lower portions thereof which are affected by the vapor or steam passing through the holes 14.

It has been found that the articles are thus very quickly and effectively cooked throughout with speed and with a uniformity not found in devices where the cooking medium strikes the articles on one side only. The mechanical relation of the parts of the apparatus are so simple that they can be taken apart readily and cleaned and the insertion and removal of the articles of food is rendered simplicity itself. The character of the cooking chamber especially those surfaces thereof which come into contact with the articles being cooked is such that the food is prepared well and quickly and with absolute purity and without any danger of contamination of any sort.

While the invention has been described in detail and with respect to the present preferred forms thereof, it is not to be limited to such details and forms since many changes and modifications may be made and the invention embodied in other forms and modifications without departing from the spirit and scope of the invention in its broadest aspects. Hence it is desired to cover any and all forms and modifications of the invention which may come within the language or scope of any one or more of the appended claims.

What is claimed, is,

1. A cooking device which comprises a metallic heating pan for water and the like, a porcelain perforated support resting on the pan and closing the top thereof, an enclosing casing of glass resting on the top of the support, a metallic cover for the casing, an imperforate pipe of vitreous enamel on the support forming a passage from the pan to a point above the articles of food on the perforated support.

2. A cooking device which comprises a heating pan of metal for water and the like, a porcelain perforated support resting on the pan and closing the top thereof, an enclosing glass casing resting on the top of the support, a metallic cover for the casing, an imperforate vitreous enamel pipe on the support forming a passage from the pan to a point above the articles of food on the perforated support, said cover constructed to act as a baffle and deflect the heating medium downwardly on to the top of the articles of food on the support.

Signed at New York city, in the county of New York, and State of New York, this 10th day of July, 1930.

CLARENCE F. COOKSON.